US005729545A

United States Patent [19]

Libman

[11] Patent Number: 5,729,545
[45] Date of Patent: Mar. 17, 1998

[54] CONTROL OF VIDEO DIALTONE CONNECTIONS

[75] Inventor: Roger Edward Libman, Naperville, Ill.

[73] Assignee: Lucent Technolgies Inc., Murray Hill, N.J.

[21] Appl. No.: 588,673

[22] Filed: Jan. 17, 1996

[51] Int. Cl.$^6$ ..................................................... H04L 12/00
[52] U.S. Cl. ........................... 370/384; 370/420; 379/220
[58] Field of Search .................................. 370/58.1, 58.2, 370/60, 60.1, 68.1, 94.1, 94.2, 110.1, 352, 355, 360, 377, 379, 384, 395, 396, 400, 410, 420, 426; 379/219, 220

[56] References Cited

U.S. PATENT DOCUMENTS

| | | | |
|---|---|---|---|
| 5,042,062 | 8/1991 | Lee et al. | 379/54 |
| 5,115,426 | 5/1992 | Spanke | 370/60 |
| 5,115,427 | 5/1992 | Johnson, Jr. et al. | 370/60 |
| 5,231,631 | 7/1993 | Buhrke et al. | 370/60 |
| 5,329,572 | 7/1994 | Martens | 370/58.1 |
| 5,333,134 | 7/1994 | Ishibashi et al. | 370/94.1 |
| 5,490,141 | 2/1996 | Lai et al. | 370/60.1 |
| 5,504,744 | 4/1996 | Adams et al. | 370/60.1 |
| 5,517,550 | 5/1996 | Kobayashi | 379/58 |
| 5,583,864 | 12/1996 | Lightfoot et al. | 370/396 |
| 5,631,903 | 5/1997 | Dianda et al. | 370/401 |

OTHER PUBLICATIONS

Ser. No. 08/557,885 ; Allowed Jun. 25, 1996, Dianda et al. 370/60.1.

*Primary Examiner*—Hassan Kizou
*Assistant Examiner*—Kwang Bin Yao

[57] ABSTRACT

A method of and apparatus for establishing a video dialtone connection between a customer's terminal, such as a set top terminal, and a server system, such as a video server. The connection is established via an access switch that is not part of a backbone broadband network. The backbone network is connected to the video server system and the access switch. A level one gateway controller controls establishment of the connection by establishing a connection between the server system and the access switch using the backbone network. A separate connection is then established between the path to the access switch and a circuit through the access switch to the customer terminal. Advantageously, the access switch need not be a part of the backbone network, an arrangement that is desirable for serving consumer type customers. The connection to the access switch is treated by the backbone network essentially as if it were a connection to a terminal or any of a group of terminals.

16 Claims, 2 Drawing Sheets

CONTROL OF VIDEO DIALTONE CONNECTIONS

TECHNICAL FIELD

This invention relates to arrangements for establishing broadband telephone connections and for controlling such connections.

PROBLEM

Video dialtone service is a service which allows users to request a video connection to some supplier of video program material and to control such connections. An access network is used to give users access to a backbone broadband network for accessing suppliers of video programs. This access network connects a user to a broadband switch, part of the backbone broadband network. The broadband switch in the preferred embodiment is an asynchronous transfer mode (ATM) switch which is used to transport video signals. To get access to the broadband switch, individual users are connected to an access switch (AS). This access switch is connected to the broadband network. The access switch switches and transmits all signals required by the set top terminals of the users connected to that access switch.

In order to maintain control of the video dialtone network, a communication controller, currently known as a level one gateway (L1G) controls all signaling required to establish connections. As taught in a pending patent application, Ser. No. 08/235,599, now abandoned assigned to the assignee of this application, users transmit their requests for a connection to the L1G over a virtual signaling circuit and the L1G responds to these requests by sending signaling messages to the switches of the broadband network. The L1G maintains records for all users (set top terminals) of the network.

While this arrangement can be used to interconnect all terminals that are connected to the backbone broadband network, it cannot be used to connect to terminals that are connected to an access switch, the access switch connected to, but not part of, the backbone broadband network. A problem of the prior art is that there is no satisfactory way to have the L1G control connections to terminals not directly connected to the backbone broadband network.

Another problem of the prior art is that if the backbone broadband network were to control connections to set top terminals connected to the network via an access switch, then the broadband switch connected to the access switch would need to store and maintain translation information identifying the access switch and end point address of each set top terminal.

SOLUTION

The problem is essentially eliminated and an advance is made over the prior art in accordance with this invention wherein video dialtone connections from a video provider's server (video server) via a backbone network to an access switch (AS) are made under the control of a first signaling message set from the L1G; a separate connection is then made through the AS to a set top terminal under the control of a second signaling message set from the L1G. The first message set is sent from the L1G to a broadband switch of the backbone network. The broadband switch need not itself store the identity of the AS serving a set top terminal (STT).

In this preferred embodiment, the communication signals are sent over asynchronous transport mode (ATM) facilities. A particular communications path between two nodes is identified by the identification of an ATM facility and by a virtual circuit identifier. The STT signals a request to the L1G. The L1G signals for a connection between the video server and the correct AS by translating the identity of the STT to that of the AS serving that STT, and by signaling to the broadband switch over a logical link identified with that AS. Although the broadband switch establishes the connection to the AS, it exchanges signaling messages with the L1G as if the connection were being made to the L1G. The broadband switch and backbone network respond by connecting a virtual circuit between the video server providing the incoming video signal and the AS, and informing the L1G of the identity of the virtual circuit and the facility for carrying that circuit. The L1G then signals the AS to establish a connection from that virtual circuit to the STT. Advantageously, the L1G controls the entire connection. Advantageously, the broadband switch need not store and, importantly, need not maintain a record of which set top box, identified by what is effectively a directory number, is connected to which AS.

DETAILED DESCRIPTION

Figure 1:
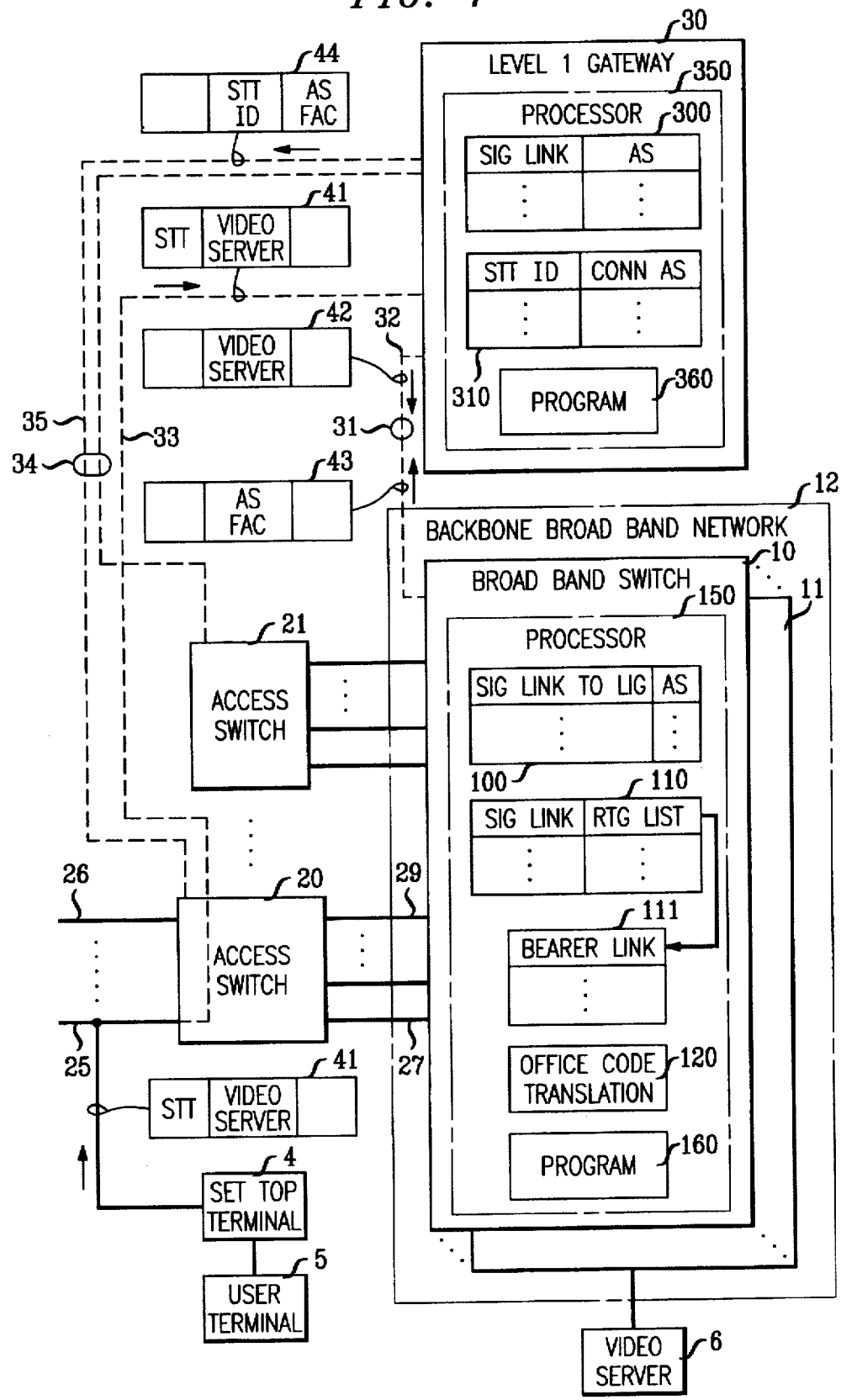
FIG. 1 is a block diagram illustrating applicant's invention including key signaling messages and translation data blocks.

FIG. 1 is a block diagram illustrating the operation of applicant's invention, illustrating the key elements of data that are stored in each block, and the key signaling messages. In this preferred embodiment, the communication signals are sent over asynchronous transfer mode (ATM) facilities. A particular communication path between two nodes is identified by the identification of an ATM facility and by a virtual circuit identifier. The objective is to establish a connection between a set top terminal 4 connected to a user terminal 5 and one or more video servers 6 for supplying content, including moving video, facsimile, fixed images, text, and high quality audio, to a user terminal. The set top terminal which is the interface between the user terminal and the network used for the connection to the video server is connected by a group of facilities (and usually by one member of such a group) 25, . . . , 26 to an access switch 20. This access switch 20 is connected by a group of facilities 27, . . . , 29 to a broadband switch 10. This broadband switch 10 is a part of a backbone broadband network 12 connected by access switches to users and connected to video servers. Connections are established through the backbone broadband network in a manner very similarly to that used for establishing voice connections in a toll network. Each broadband switch has office code translations used for determining which sets of directory numbers, such as the numbers of video servers, can be accessed via which switches 10, . . . , 11 of the backbone broadband network. In the example, a particular video server 6 is connected to broadband switch 11 of the backbone broadband network. A video server can supply any signal which can be carried over an ATM network; examples are video, audio, and data. Each broadband switch is controlled by a processor, such as processor 150 of switch 10, which is controlled by a program 160.

Also connected to broadband switch 10 are a plurality of access switches (AS) 20, . . . , 21, and a controller called a level 1 gateway (L1G) 30. L1G 30 is controlled by a processor 350 operating under the control of a program 360.

When a connection is to be established, a request message 41, transmitted over a signaling channel 33, is received by the L1G from a user terminal 5 via the set top terminal 4 of that user; the message requests that the L1G signal to broadband switch 10 and access switch 20 to establish the desired connection to video server 6. (The signaling channel 33 is shown as passing only through access switch 20, although the physical channel is likely to be routed via broadband switch 10.) This is accomplished by having the L1G send a signaling message requesting broadband switch 10 to establish a connection from access switch 20 to video server 6. In order to simplify administration and operation of the system, the translation relating each set top terminal identity to a particular access switch is not maintained in the broadband switch. This translation is maintained in the level one gateway, L1G 30 which has overall control of all pertinent connections established through broadband switch 10, and which performs functions such as billing that require information about each set top terminal. Consequently, the message 42 from the level one gateway to broadband switch 10 must identify the particular access switch which in turn will identify the facilities for making a connection to that access switch. In applicant's preferred embodiment, this identity is passed on via the identity of the particular logical signaling link 32, out of a bundle of such links, 31, used for signaling the request to establish the connection, because each access switch is associated with a different logical signaling link. In this case, access switch 20 is associated with signaling link 32. Effectively, signaling link 32 is a non-associated link for communication (bearer) facilities 27, . . . , 29. In effect, the messages between the L1G and switch 10 are treated as if the L1G were another switch of the backbone broadband network 12, and the facilities 27, . . . , 29 were the facilities connecting switch 10 with that other switch.

When broadband switch 10 receives a signaling message, requesting establishment of a connection to video server 6, over signaling link 32, it translates from the identity of that signaling link to the identity of the access switch; broadband switch 10 has a list of the facilities available for establishing connections to that access switch. In response to the receipt of the message, the broadband switch controls the establishment of the connection between AS 20 and video server 6. Broadband switch 10 initiates the establishment of this connection and returns a message 43 over signaling link 32 to L1G 30 identifying the particular facility and virtual circuit being used for the connection to access switch 20. L1G 30 then transmits signaling message 44 over signaling link 35 of the signaling link group 34 used to control the access switches, requesting access switch 20 to establish a connection between the set top terminal as specified by the identification of that set top terminal, and the particular facility and virtual circuit being used for the connection between video server and access switch 20. Effectively, signaling link 35 is the non-associated signaling link for communication links 25, . . . , 26. Signaling link group 34 is routed through broadband switch 10.

While in this description, only the key messages are discussed, each of the key messages is part of a set of messages as required by standard protocols.

Applicant will now describe the pertinent translation information retained in the broadband switch and L1G in order to implement this invention. The broadband switch contains information relating the identity of each access switch to the signaling link between the broadband switch and the L1G in order to exchange signaling information regarding that access switch with broadband switch 10 (translation block 100). In effect, the broadband switch reacts as if the message 42 had been sent from AS 20. Broadband switch 10 also retains translation information, necessary for non-associated signaling, between the signaling link related to the access switch and a list of the facilities (bearer links) connecting the broadband switch to each such access switch (blocks 110 and 111). The broadband switch also contains office code translation 120 necessary for routing calls received in the broadband switch toward a destination such as the video server. Note that broadband switch 10 need not retain translation information identifying the access switch connected to each set top terminal or the end point address of that terminal.

Level 1 Gateway 30 contains translation information relating each signaling link (such as links 32 and 35) to the corresponding access switch (block 300), and identifying the access switch serving each terminal (block 310).

Figure 2:
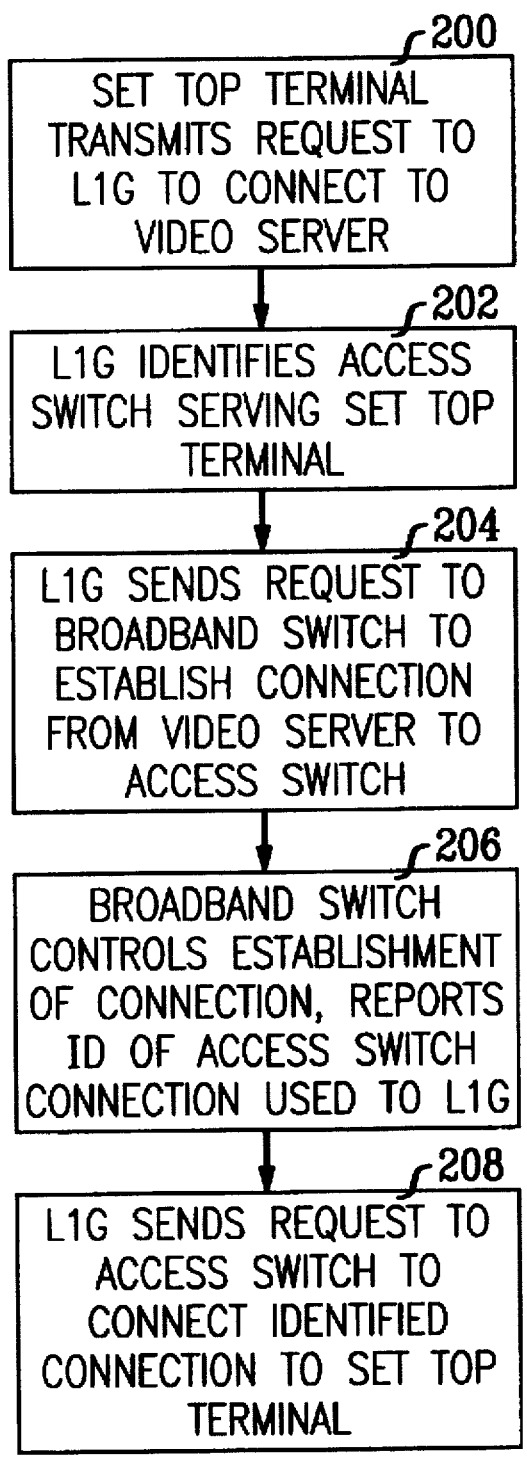
FIG. 2 is a flow diagram illustrating the method of applicant's invention.

FIG. 2 illustrates the method of applicant's invention. A request for a connection to the video server is transmitted from the customer's set top terminal (action block 200). The L1G identifies the access switch serving the set top terminal, using the information in translation block 310 (action block 202). The L1G then sends a request to the broadband switch to establish a connection between the serving access switch and the video server (action block 204). This request is sent over a signaling channel which appears to the broadband switch to originate in the access switch. The broadband switch controls the establishment of the connection and signals the L1G (as if it were the access switch) the identity of the connection link and virtual circuit between the broadband switch and the access switch (action block 206). The L1G then signals a request to the access switch to establish a connection between that link and virtual circuit and the set top terminal (action block 208).

Although, for clarity, only a few single messages have been illustrated and discussed, it is well known that the actual protocols usually require a set of messages, including, for example, acknowledgements, to perform a signaling transaction.

I claim:

1. A method of establishing a telecommunications connection from a terminal connected to an access switch, the access switch being connected to a broadband switch of a backbone network, to a server system connected to that backbone network, comprising the steps of:

in a communications controller separate from said backbone network and for controlling a plurality of switches of the backbone network, receiving via the access switch a first request message set from said terminal, the first request message set comprising data for identifying said server system;

in said communications controller, identifying said access switch to which said terminal is connected;

from said communications controller, signaling via a second request message set to said broadband switch to establish a connection between said access switch and said server system, the request being transmitted over a first logical signaling link treated by said broadband switch as if it originated in the access switch;

responsive to receipt of said second request message set by said broadband switch, controlling establishment of the requested connection;

sending a response message set, over said first logical link, for identifying a path used for said connection to said access switch, from said broadband switch to said communications controller; and over a second logical signaling link specific to said access switch, sending a third request message set from said communications controller to the access switch to connect the identified path to the terminal.

2. The method of claim 1 wherein said broadband switch stores no translations relating an identification of a terminal to the equipment location of that terminal on said access switch.

3. The method of claim 1 wherein the identified path is an identified virtual circuit over an identified asynchronous transfer mode (ATM) facility.

4. The method of claim 1 wherein the connection between said terminal and said server system is an asynchronous transfer mode (ATM) connection.

5. The method of claim 1 wherein said server system provides video signals.

6. The method of claim 1 wherein said server system provides audio signals.

7. The method of claim 1 wherein said server system provides data signals.

8. The method of claim 1 wherein said communication controller is a level one gateway or equivalent system.

9. Apparatus for controlling establishment of a telecommunications connection from a terminal connected to an access switch, via a broadband backbone network, to a server system, comprising:
 a communications controller, separate from said backbone network and for controlling a plurality of switches of said backbone network, comprising processor means for executing a program;
 said processor means comprising memory for storing said program;
 said processor means comprising memory for storing translation data;
 said processor means comprising means for receiving and transmitting data messages;
 said processor means operative under control of said program for:
  (1) receiving via the access switch a first request message set from said terminal, the first request message comprising data for identifying said server system;
  (2) using said translation data, identifying said access switch to which said terminal is connected;
  (3) signaling a second request message set to said system, the request being transmitted over a first logical signaling link treated by said broadband switch as if it originated in the access switch;
  (4) receiving a response message set, over said first logical link, for identifying a path used for said connection to said access switch, from said broadband switch; and
  (5) over a second logical signaling link specific to said access switch, sending a third request message set to the access switch to connect the identified path to the terminal.

10. The apparatus of claim 9 wherein the identified path is an identified virtual circuit over an identified asynchronous transfer mode (ATM) facility.

11. The apparatus of claim 9 wherein said communication controller is a level one gateway or equivalent system.

12. Apparatus for controlling establishment of a telecommunications connection from a terminal connected to an access switch, via broadband backbone network to a server system, comprising a broadband switch of said backbone network;
 said broadband switch comprising processor means for executing a program;
 said processor means comprising memory for storing said program;
 said processor means comprising memory for storing translation data;
 said processor means comprising means for receiving and transmitting data messages;
 said processor means operative under the control of said program for:
  (1) receiving a first request message set from a communications controller, said communications controller separate from said backbone network and for controlling a plurality of switches of said backbone network, to establish a connection between said access switch and toward said server system, the request being transmitted over a first logical signaling link identified in said translation data as originating in the access switch:
  (2) responsive to receipt of said first request message set, controlling establishment of the requested connection; and
  (3) sending a response message set, over said first logical link, for identifying a path used for said connection to said access switch, for causing said communications controller to control a connection of the identified path to the terminal.

13. The apparatus of claim 12 wherein said broadband switch stores no translations relating an identification of a terminal to the equipment location of that terminal on said access switch.

14. The apparatus of claim 12 wherein the identified path is an identified virtual circuit over an identified asynchronous transfer mode (ATM) facility.

15. The apparatus of claim 12 wherein the connection between said terminal and said server system is an asynchronous transfer mode (ATM) connection.

16. The apparatus of claim 12 wherein said communication controller is a level one gateway or equivalent system.

\* \* \* \* \*